United States Patent Office
3,198,946
Patented Aug. 3, 1965

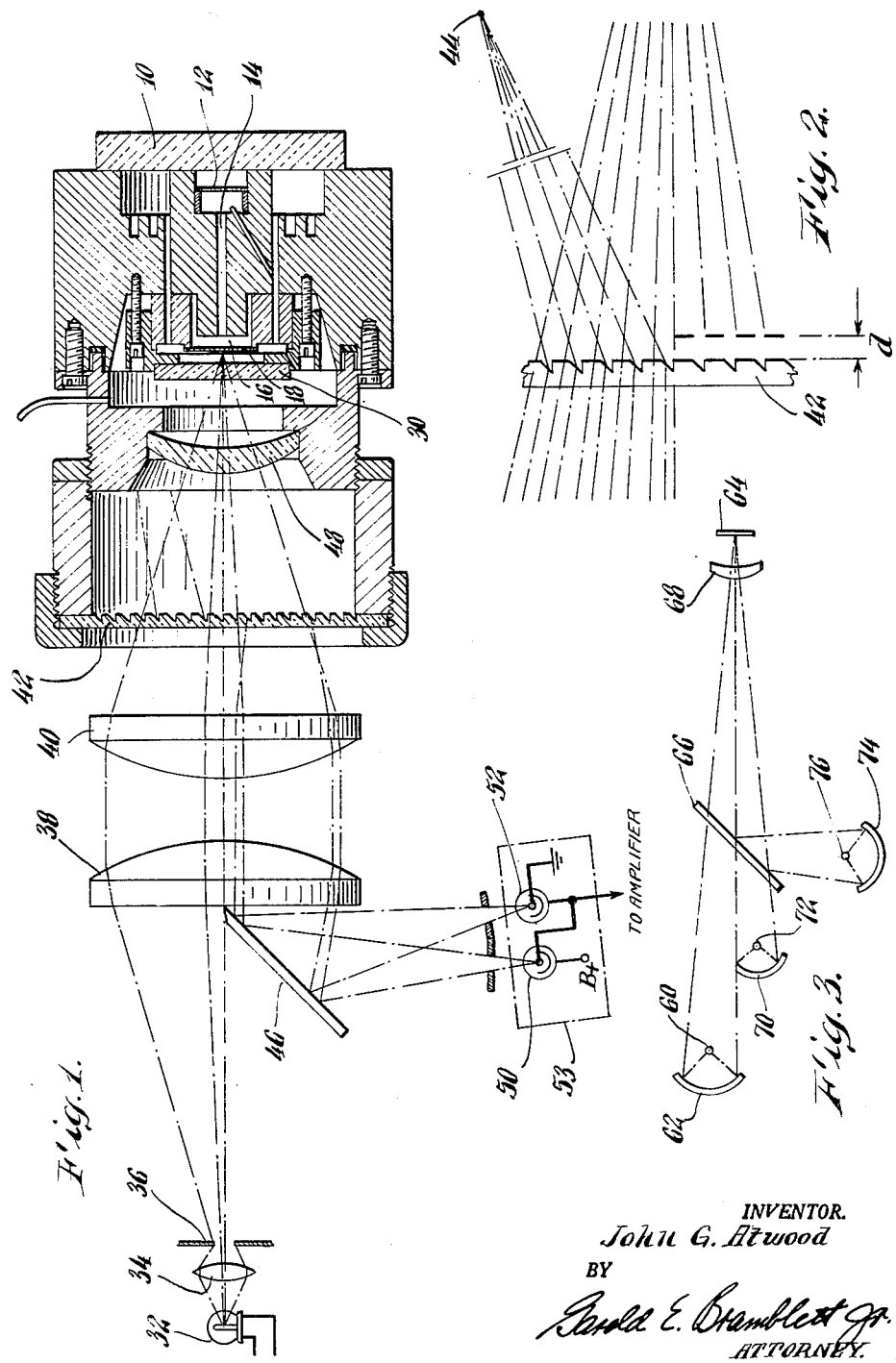

3,198,946
APPARATUS FOR SENSING POSITION OF A RADIATION REFLECTOR
John G. Atwood, West Redding, Conn., assignor to The Perkin-Elmer Corporation, Norwalk, Conn., a corporation of New York
Filed Oct. 26, 1960, Ser. No. 65,073
14 Claims. (Cl. 250—83.3)

This invention relates to position sensing devices and, more particularly, to optical apparatus for sensing the position of a radiation reflector.

It is often desirable to measure slight changes in the position of an object by optical means. An example of a measurement of this type is found in the disclosure of U.S. Patent 2,557,096 which issued June 19, 1951 to Marcel J. E. Golay. This patent relates to a Radiation Detecting Device and is primarily concerned with a detector for infrared radiation. The device disclosed therein comprises essentially a closed chamber which is filled with an expansible gas. One wall of this chamber is a membrane upon which is mounted a flexible mirror. When infrared radiation is directed into the chamber, it causes an expansion of the gas. Flexure of the membrane and movement of the mirror is then measured optically as an indication of the amount of infrared radiation detected.

The essential elements of the Golay device, as illustrated in FIG. 1 of his patent, include a light source, a condensing lens system, a meniscus lens, a line grid, and a light detector. Half of the line grid is illuminated from the light source by means of the condensing system which images the light source at the flexible mirror. The meniscus lens images the upper half of the grid on the flexible mirror and also reimages its reflected image on the lower half of the grid. The line grid is so positioned with respect to the meniscus lens and mirror that, when the mirror is flat, the line grid is imaged slightly out of focus on itself with the images of the light transmitting portions of the upper half of the line grid coinciding with the light intercepting portions of the lower half of the same grid. Thus only a very small amount of light passes the lower half of the grid. The light that does pass is intercepted by a plane mirror and is reimaged by the condensing system on a photo-detector. As the mirror flexes, the total light received by the detector varies and the signal produced is thus proportional to the amount of flexure.

The Golay apparatus has proven itself of value in the measurement of position changes of the mirror along the "line of sight." However, there are certain problems inherent in this apparatus which limit its usefulness in the absence of relatively expensive auxiliary components. One of the most troublesome problems encountered is that the device is extremely sensitive to variations in the intensity of the light source. This has necessitated the use of a stabilized power supply or batteries for operation of the light.

It is, therefore, the primary object of the present invention to provide an improved type of optical position sensor.

Another object of the invention is to provide such a sensor that is independent of variations in intensity of the light source.

Another object is to provide such a sensor which utilizes a double beam optical system.

Another object is to provide a radiation detecting device incorporating such an improved sensor.

The above objects are achieved by providing such a sensing device having a radiation source, means for directing radiation from the source onto a movable reflector, and radiation limiting means positioned optically between the source and the reflector for transmitting radiation therebetween. Optical imaging means are then provided to form a real image of the limiting means in the reflected radiation from the reflector. Radiation directing means are positioned along the optical axis of the reflected radiation to direct a first portion of the radiation from the real image in a first direction and a second portion in a second direction. Detector means are positioned to be responsive to both the first and second portions of radiation.

This invention will be more fully explained in the following detailed description having particular reference to the attached drawings wherein:

FIG. 1 is a longitudinal sectional view of an infrared detecting device having an optical system in accordance with the present invention;

FIG. 2 is an enlarged view of a type of roof grating usable with the invention; and FIG. 3 is an illustration of a variation of the optical system of this invention.

Referring to FIG. 1, the infrared detection portion of the apparatus is identical to that illustrated in FIG. 1 of the aforementioned patent. Infrared radiation enters the detector through a radiation permeable window 10. The radiation strikes a radiation absorbing membrane 12 and causes expansion of a gas contained in duct 14 and mirror chamber 16. As the gas expands and contracts, flexible mirror 18 flexes toward and away from optical window 30.

The optical sensing portion of the apparatus includes light source 32, pre-condensing lens 34, and aperture stop 36 for forming a high intensity light source of controlled size and configuration. Two plano-convex lenses 38, 40 form an image of stop 36 on mirror 18. A roof grating 42 having a configuration shown is enlarged detail in FIG. 2 is inserted in the optical path betwen lens 40 and mirror 18. Half of the grating surface is flat and thus has no significant effect on the radiation forming the image of stop 36. The remainder of the grating surface is prismatic and causes a second image of stop 36 to be formed at point 44.

A mirror 46 is located between aperture stop 36 and lens 38. This mirror will be seen to exclude light from the lower halves of lenses 38 and 40 and grating 42. A meniscus lens 48 is mounted before mirror 18 to receive light leaving the upper half of grating 42. This lens forms an image of the radiation-emitting flats of the upper half of grating 42 at approximately the surface of mirror 18. The same lens reimages the reflected radiation to form a real image of the flats at some small but finite distance $d$ in advance of the grating as shown in FIG. 2. The apparatus is adjusted so that when mirror 18 is plane, distance $d$ is such that approximately one half the radiation from the image of each flat passes through a similar flat surface in the lower half of the grating while the other half passes through prismatic surfaces. In this manner the radiation passing to the lower half of the lens system 40, 38 is divided and the lenses form two images of aperture stop 36. The radiation forming these images is intercepted by mirror 46 and redirected. A first photo-detector 50 is positioned at one image and a second photo-detector 52 is positioned at the other. The detectors are connected in a differential circuit 53 and the difference signal is amplified for use in a recording or other circuit.

The operation of the device is as follows:

Light from source 32, after passing through the pre-condenser 34 and aperture stop 36, is focused by the upper portions of condensing lenses 38, 40 on mirror 18. A second image is formed at 44 (FIG. 2). This second image is not used and may be discarded. Although this results in a loss of energy, such loss is not damaging in view of the advantages gained by the invention.

The meniscus lens positioned before mirror 18 images the surface of grating 42 near or on the surface of mirror 18. The same lens forms a second image of the upper half of the grating surface on an image plane slightly ahead of the lower half of grating 42 as previously explained. Half the radiation from this image passes through the flat portion of grating 42, is reimaged by the condensing lenses 40, 38, and reflected by mirror 46 to detector 50. The other half of the radiation passes through the prismatic portions of the grating and is similarly imaged on detector 52. Alternatively, in some applications it may be desirable to form the image elements on the plane of grating 42 but midway between a flat and a prismatic surface.

It will be seen that a double beam system is thus formed that is immune to any variations in the intensity of light source 32. Any such variation has an equal effect on both detectors and is thereby cancelled out. As mirror 18 flexes in either direction, the grating image is caused to approach or recede from the grating surface. The difference between the radiation intensities at detectors 50, 52 is then a function of the flexure of mirror 18. The apparatus will be seen to indicate and differentiate between movements of the mirror in either direction.

A modification of this invention is illustrated in FIG. 3. In this embodiment a radiation source 60 and an ellipsoidal mirror 62 direct radiation onto a movable mirror 64. The radiation passes through a strip-silvered mirror 66, having the silvered portions on the side away from the source. Meniscus lens 68 focuses the resulting stripes of radiation from the upper half of mirror 66 onto the lower half. The resulting image is so positioned that half the radiation passes through the unsilvered portions of the mirror to an ellipsoidal reflector 70 and are focused on detector 72. The radiation reflected by the silvered portions is directed by ellipsoidal reflector 74 onto detector 76. Detectors 72 and 76 are located in a differential circuit which may be of the type used in the previously described embodiment of FIG. 1.

It will be apparent that the apparatus of this invention may be subject to a number of modifications. For example, although the described embodiment is utilized to measure the flexure of a mirror, the inventive concept need not be so limited. The device is equally adapted to the measurement of any change in a "target" mirror which will cause a difference in the radiation intensities at the detectors. Thus, the invention will measure any total displacement of a mirror along the line of sight and any distortion of the mirror. It will also be noted that the apparatus is suitable for measuring rotation of the target mirror and may be designed to be sensitive to tilt around one axis but not the other. For example, in the embodiment of FIG. 1, if plane mirror 18 could be tilted bodily, it will be seen that tilt about an axis perpendicular to the plane of the drawing would be easily detectable by causing the striped image at element 42 to move perpendicular to the direction of the grating grooves. However, tilt about a vertical axis lying in the plane of the drawing would not be detected as the striped image would then move parallel to the grating groove.

The "radiation limiting means" employed in this invention are also subject to modification. The foregoing description specifically discloses the use of a strip-silvered mirror and a transmission "grating" having alternating flat and prismatic portions. However, such a grating need not be manufactured in the form of the usual interference grating and, as a matter of fact, the groove spacing may be quite large compared to such gratings. For these reasons, the term "roof grating" as used in the attached claims includes any radiation transmitting member having at least one surface comprising pairs of parallel alternating flat strip portions having an angle of incidence to one another and adapted to refract transmitted light into at least two directions of travel.

It will be readily apparent to those skilled in the art that the apparatus of the invention is usable in a wide variety of applications. Other uses than those discussed supra would include theodolite and machine tool positioning devices. Other variations will be readily apparent.

It is to be understood, therefore, that the breadth of the invention is limited only by the scope of the following claims:

I claim:

1. A position sensing device for measuring changes in the position of a radiation reflector which comprises radiation source means; means for directing radiation from said source means onto said reflector; radiation limiting means positioned optically between said source means and said reflector for dividing the radiation into discrete bands before it is incident on said reflector; optical imaging means positioned to form a real image of said limiting means in the reflected radiation from said reflector; radiation directing means positioned along the optical axis of the reflected radiation to direct a first portion of each band of the radiation from said real image in a first direction and direct a second portion of each band of the radiation from said real image in a second direction; and detector means responsive to both of said first and second portions of radiation.

2. The device of claim 1 wherein said radiation directing means comprises at least two radiation receiving units positioned to receive radiation from a single radiation band in said real image and transmit said first and second portions of radiation therefrom.

3. The device of claim 2 wherein both of said radiation limiting means and said radiation directing means are comprised of a single transmission roof grating.

4. The device of claim 2 wherein both of said radiation limiting means and said radiation directing means are comprised of a single transmission grating having on at least one surface thereof parallel alternately arranged flat and prismatic surfaces.

5. The device of claim 2 wherein both of said radiation limiting means and said radiation directing means are comprised of a single strip-silvered mirror.

6. The apparatus of claim 1 wherein said radiation directing means is displaced from said real image along the axis of the reflected radiation.

7. A position sensing device for sensing changes in the position of a radiation reflector which comprises radiation source means; focusing means for directing radiation from said source means onto said reflector; transmission grating means having a first portion positioned optically between said focusing means and said reflector and adapted to transmit a portion of the radiation from said focusing means falling thereon to said reflector and having a second portion positioned optically in the reflected radiation from said reflector to transmit in first and second directions radiation received at said second portion; optical imaging means positioned between said grating means and said reflector to form a real image of the first portion of said grating means substantially at the second portion thereof; and differential detector means positioned to receive and respond to the radiation transmitted by said second portion from said real image in each said first and second direction.

8. The apparatus of claim 7 wherein said focusing means in an aspheric reflector.

9. The apparatus of claim 8 wherein said aspheric reflector is an ellipsoid.

10. The apparatus of claim 7 wherein said transmission grating is a strip-silvered mirror.

11. A position sensing device for measuring changes in the position of a first mirror which comprises light source means; a first lens means for directing light from said source means onto said first mirror; a transmission roof grating including first and second light transmitting sections each having a series of parallel similar first portions for transmitting received light generally in a first direction and an alternately arranged series of parallel similar second portions for transmitting received light generally in a different second direction, said first portion of said first section being positioned optically between said first lens means and said first mirror and adapted to transmit to said first mirror a portion of the light from said first lens means falling thereon; second lens means imaging said first section of said grating substantially at said first mirror and reimaging said first section near said second section; light detector means; and second mirror means positioned optically between said detector means and said first lens means to receive from said first lens means and redirect to said detector means the light passing through both said portions of said second section.

12. In a detecting device, a mirror distorted in response to gaseous pressure; a source of light directed toward said mirror; a light transmitting grid in the path of light between said source and said mirror and in the light path of the light reflected from said mirror, said grid being adapted to separate said reflected light into first and second portions to an extent dependent on the distortion of said mirror; and differential photo-sensitive means positioned to receive and respond differentially to said first and second portions of said reflected light.

13. A radiation detection device including a flexible mirror which is flexed in response to changes in radiation intercepted by said device; a source of light directed toward said mirror for reflection of light from said mirror; a transmission grating between said source and said mirror adapted to separate light received by said grating into two portions and to transmit said two portions in generally different directions; a lens between said grating and said flexible mirror, said lens and said mirror forming a variable focus system having a variable focal plane which is displaced ahead of said grating a small but finite distance along the optical axis of the reflected light when said flexible mirror is in its flat condition and which is displaced axially to a different position when said mirror is flexed; and differential photosensitive detector means adapted to receive and compare the intensities of the first and second portions of the light transmitted from said focal plane through said grating.

14. A radiation detecting device including a flexible mirror which is flexed in response to changes in radiation intercepted by said device; a source of light; a light-condensing system in light-intercepting relationship with respect to said light for directing light toward said mirror for reflection of light from said mirror; a transmission grating in the path of the beam of light refracted by said condensing system, said transmission grating being positioned between said condensing system and said mirror; a fixed mirror between said source of light and said condensing system, said fixed mirror blocking a portion of the light beam which would otherwise reach said condensing system and said transmission grating; differential photo-sensitive cell means; and a lens between said grating and said flexible mirror forming a variable focus system having a variable focal plane which is displaced ahead of said grating a small but finite distance along the optical axis of the reflected light when said flexible mirror is planar and which is displaced axially to a different position when said flexible mirror is flexed, said grating being adapted to separate the light received from said focal plane into two portions and to transmit said two portions in different directions, said fixed mirror being positioned to deflect said two portions of light transmitted by said grating from said focal plane onto said photo-sensitive cell means.

References Cited by the Examiner

UNITED STATES PATENTS

| 2,003,804 | 6/35 | Falge | 88—57 |
|---|---|---|---|
| 2,031,884 | 2/36 | Gray | 250—83.3 |
| 2,557,096 | 6/51 | Golay | 250—83.3 |
| 2,705,758 | 4/55 | Kraprelian | 250—83.3 |
| 2,794,926 | 6/57 | Watts et al. | 250—83.3 |
| 2,873,381 | 2/58 | Laurcesch | 250—83.3 |
| 2,886,970 | 5/59 | Munker | 250—83.3 |
| 2,974,227 | 3/61 | Fisher et al. | 250—43.5 |
| 3,004,470 | 10/61 | Ruhle | 81—1.5 X |
| 3,004,664 | 10/61 | Dreyfus | 250—43.5 |

RALPH G. NILSON, *Primary Examiner.*

ARTHUR GAUSS, ARCHIE R. BORCHELT,
*Examiners.*